(12) United States Patent
Nakamura et al.

(10) Patent No.: US 8,025,438 B2
(45) Date of Patent: Sep. 27, 2011

(54) ELECTRONIC CLINICAL THERMOMETER, METHOD OF CONTROLLING THE SAME, AND CONTROL PROGRAM

(75) Inventors: Kouji Nakamura, Fujinomiya (JP); Makoto Ikeda, Fujinomiya (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 0 days.

(21) Appl. No.: 12/007,552

(22) Filed: Jan. 11, 2008

(65) Prior Publication Data

US 2008/0175302 A1 Jul. 24, 2008

Related U.S. Application Data

(63) Continuation of application No. PCT/JP2006/313392, filed on Jul. 5, 2006.

(30) Foreign Application Priority Data

Jul. 12, 2005 (JP) ................................. 2005-203128

(51) Int. Cl.
*G01K 7/42* (2006.01)
*G01K 7/21* (2006.01)

(52) U.S. Cl. ........ 374/169; 374/170; 374/102; 702/136; 600/549

(58) Field of Classification Search .................. 374/163, 374/164, 120, 121, 178, 183, 141, 134, 137, 374/1, 170, 169, 100–104; 702/139, 130–131, 702/169, 99, 136; 600/474, 549; 703/2

See application file for complete search history.

(56) References Cited

U.S. PATENT DOCUMENTS

| | | | | | |
|---|---|---|---|---|---|
| 4,443,851 | A | * | 4/1984 | Lin | 600/551 |
| 4,530,366 | A | * | 7/1985 | Nessi et al. | 600/549 |
| 4,843,577 | A | * | 6/1989 | Muramoto | 702/131 |
| 4,866,621 | A | * | 9/1989 | Ono | 600/549 |
| 5,015,102 | A | * | 5/1991 | Yamaguchi | 374/107 |
| 5,269,325 | A | * | 12/1993 | Robinson et al. | 600/409 |
| 5,392,031 | A | * | 2/1995 | Toriumi et al. | 340/588 |
| 5,473,629 | A | * | 12/1995 | Muramoto | 374/102 |
| 5,738,441 | A | | 4/1998 | Cambridge et al. | |
| 6,220,750 | B1 | * | 4/2001 | Palti | 374/164 |
| 6,439,768 | B1 | * | 8/2002 | Wu et al. | 374/169 |
| 7,284,904 | B2 | * | 10/2007 | Tokita et al. | 374/163 |

(Continued)

FOREIGN PATENT DOCUMENTS

EP 0 561 349 A1 9/1993

(Continued)

OTHER PUBLICATIONS

PCT/ISA/210.

(Continued)

*Primary Examiner* — Gail Verbitsky
(74) *Attorney, Agent, or Firm* — Buchanan Ingersoll & Rooney PC

(57) ABSTRACT

An electronic clinical thermometer having a low frequency of errors can be implemented. The electronic clinical thermometer for predicting an equilibrium temperature based on a temporal change in the actual measurement value of a temperature at a measurement target detected by a temperature detection element includes an abnormal change detection unit which detects an abnormal change of an actual measurement value from the temperature detection element, and a control unit which controls the start timing of a temporal change in actual measurement value used for derivation of a prediction value when the abnormal change detection unit detects an abnormality.

4 Claims, 6 Drawing Sheets

U.S. PATENT DOCUMENTS

| | | | |
|---|---|---|---|
| 7,318,004 B2 * | 1/2008 | Butterfield | 702/130 |
| 7,637,657 B2 * | 12/2009 | Yamamoto et al. | 374/169 |
| 7,778,791 B2 * | 8/2010 | Nakamura et al. | 702/130 |
| 2002/0003832 A1 * | 1/2002 | Siefert | 374/169 |
| 2006/0224349 A1 * | 10/2006 | Butterfield | 702/130 |
| 2007/0100564 A1 * | 5/2007 | Fraden | 702/22 |
| 2008/0112461 A1 * | 5/2008 | Bisch et al. | 374/163 |
| 2009/0022202 A1 * | 1/2009 | Yamamoto et al. | 374/104 |
| 2009/0129433 A1 * | 5/2009 | Zhang et al. | 374/102 |

FOREIGN PATENT DOCUMENTS

| | | | |
|---|---|---|---|
| EP | 561348 A1 * | 9/1993 | |
| JP | 60-212145 A | 10/1985 | |
| JP | 62-111637 U | 7/1987 | |
| JP | 62-265539 A | 11/1987 | |
| JP | 5-264362 A | 10/1993 | |
| JP | 5-264363 | 10/1993 | |
| JP | 405264362 A * | 10/1993 | |
| JP | 5-322664 A | 12/1993 | |
| JP | 2001-520741 A | 10/2001 | |
| JP | 020071776 A * | 3/2007 | |
| JP | 2007068839 A * | 3/2007 | |
| WO | WO 97/03340 A1 | 1/1997 | |

OTHER PUBLICATIONS

PCT/ISA/237.

Extended Search Report issued in EP 06 76 7898.7, Apr. 6, 2009, European Patent Office, The Hague, The Netherlands.

Notification of Transmittal of Copies of Translation of the International Preliminary Report on Patentability (Form PCT/IB/338, with accompanying English Translation of the International Preliminary Report on Patentability (Form PCT/IB/373) and English Translation of the Written Opinion (Form PCT/IB/237), issued in corresponding International Patent Application No. PCT/JP2006/313392, mailed Jan. 24, 2008, IB of WIPO, Geneva, CH.

* cited by examiner

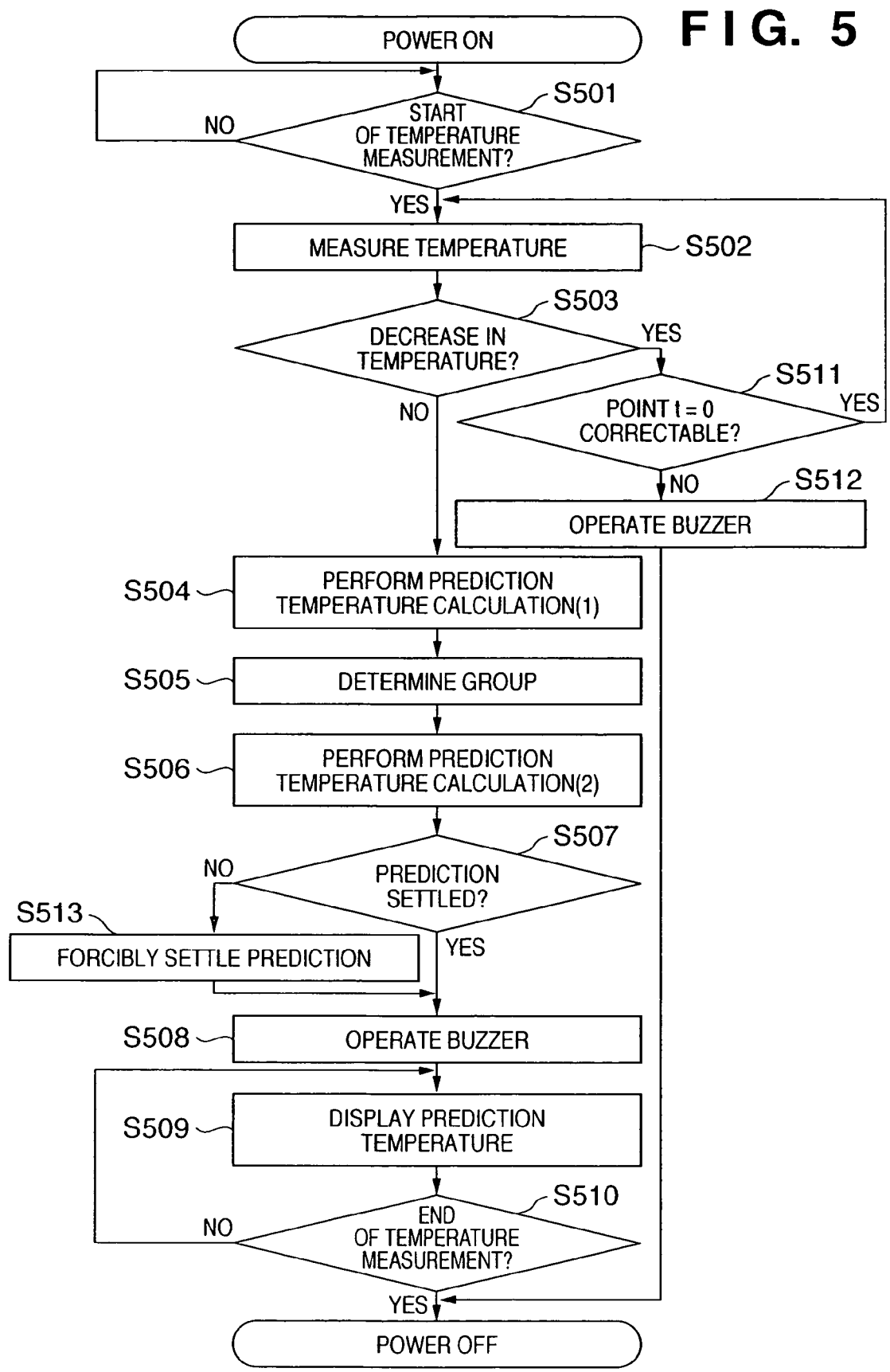

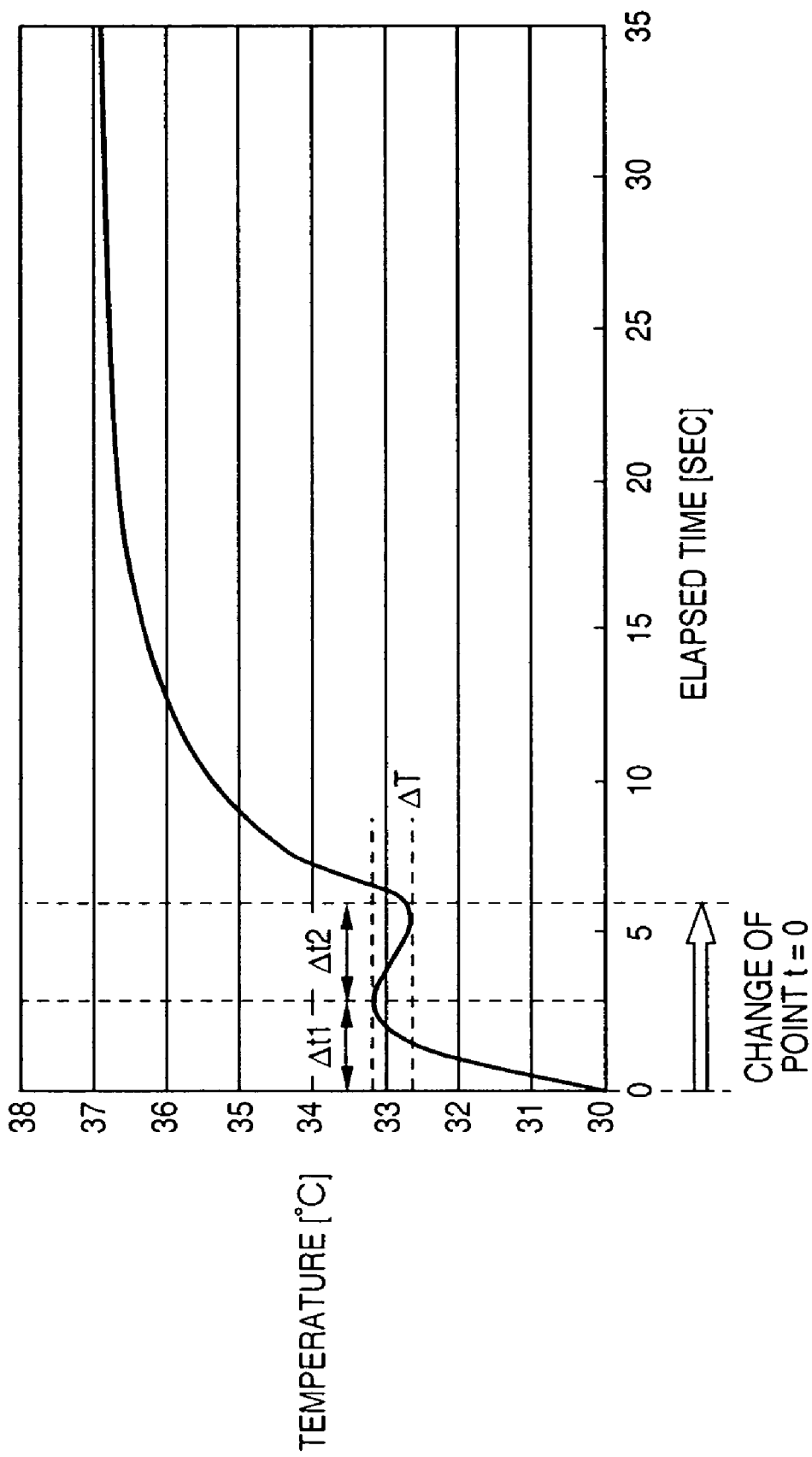

ELECTRONIC CLINICAL THERMOMETER, METHOD OF CONTROLLING THE SAME, AND CONTROL PROGRAM

TECHNICAL FIELD

The present invention relates to a high-speed body temperature prediction technique in an electronic clinical thermometer.

BACKGROUND ART

In a conventional prediction type electronic clinical thermometer, prediction operation starts at a time when the actual measurement value is equal to or more than a predetermined value and the rate of temperature rise is equal to or more than a predetermined value. A prediction settling point is given at a time when a variation in prediction value falls within a predetermined value. A prediction value Y is generally given by Y=T+U where T is the actual measurement value and U is the additional value.

A variety of calculation methods provide the additional amount U, and examples of the calculation methods are $U=a_1 \times dT/dt + b_1$ and $U=(a_2 \times t + b_2) \times dT + (c_2 \times t + d_2)$.

The parameters $a_1$, $b_1$, $a_2$, $b_2$, $c_2$, and $d_2$ are constants selected to keep the precision of the additional amount U constant regardless of patients and temperature detection elements.

Parameters used for prediction calculation equations are grouped depending on the features of patients and the characteristics of temperature detection elements. In particular, there is disclosed a technique for determining parameter groups based on actual measurement values of the temperature detection element to allow prediction with a higher precision. There is also disclosed a technique for changing corresponding parameter groups based on temporal changes in prediction values upon determining the parameter groups to allow prediction with a higher precision (patent reference 1).
Patent Reference 1: Japanese Patent No. 3100741

DISCLOSURE OF INVENTION

Problems that the Invention is to Solve

In the conventional prediction type electronic clinical thermometer, however, since the heat capacity of a temperature detection element and its vicinity is high, it takes a long time (e.g., 90 sec) to cause the temperature detection element to reach thermal equilibrium. The prediction calculation time is much shorter than the time required to cause the temperature measurement element to reach a thermal equilibrium with a measurement target. Even if high-speed prediction calculation is performed with a recent energy-saving, high-speed CPU, a decrease in time required until the result is displayed is limited. On the other hand, a decrease in heat capacity of the temperature detection element and its peripheral portion tends to vary the actual measurement values. This undesirably increases the frequency of prediction errors. Therefore, it takes a long period of time until the end of measurement, thus increasing the load on a measurement operator.

The present invention has been made in consideration of the above problem, and has as its object to reduce the load on the measurement operator by reducing the frequency of prediction errors caused by variations in actual measurement values when the heat capacity of a temperature detection element and its peripheral portion is reduced.

Means of Solving the Problems

In order to solve the above problem, an electronic clinical thermometer according to the present invention comprises the following arrangement. That is, there is provided an electronic clinical thermometer for predicting an equilibrium temperature based on a temporal change in actual measurement value of a temperature at a measurement target detected by a temperature detection element, comprising abnormal change detection means for detecting an abnormal change of an actual measurement value from the temperature detection element, and control means for controlling a start timing of a temporal change in actual measurement value used for derivation of a prediction value when the abnormal change detection means detects an abnormality.

The abnormal change includes at least a decrease in actual measurement value.

The start timing is a timing at which the abnormal change of the actual measurement value is complete.

The electronic clinical thermometer is characterized in that the temperature detection element and its peripheral portion have a low heat capacity and a high heat response.

In order to solve the above problem, a method of controlling an electronic clinical thermometer according to the present invention has the following steps. That is, there is provided a method of controlling an electronic clinical thermometer for predicting an equilibrium temperature based on a temporal change in the actual measurement value of a temperature at a measurement target detected by a temperature detection element, comprising an abnormal change detection step of detecting an abnormal change of an actual measurement value from the temperature detection element, and a control step of controlling a start timing of a temporal change in actual measurement value used for derivation of a prediction value when an abnormality is detected in the abnormal change detection step.

In order to solve the above problem, a control program of an electronic clinical thermometer according to the present invention has the following program codes. That is, there is provided a control program of an electronic clinical thermometer for predicting an equilibrium temperature based on a temporal change in actual measurement value of a temperature at a measurement target detected by a temperature detection element, comprising a program code for an abnormal change detection step of detecting an abnormal change of an actual measurement value from the temperature detection element, and a program code for a control step of controlling a start timing of a temporal change in actual measurement value used for derivation of a prediction value when an abnormality is detected in the abnormal change detection step.

EFFECTS OF THE INVENTION

The present invention can implement an electronic clinical thermometer with a low frequency of errors, thereby reducing the load on the measurement operator.

BRIEF DESCRIPTION OF DRAWINGS

FIG. 5 is a flowchart showing operation of the electronic clinical thermometer according to the first embodiment; and FIG. 6 shows a change time series of actual measurement values of the temperature detection element (with an initial ripple).

BEST MODE FOR CARRYING OUT THE INVENTION

An exemplary embodiment of the present invention will be described in detail with reference to the accompanying drawings. The constituent elements described in the embodiment are merely examples. The scope of the present invention is not limited to these constituent elements.

First Embodiment

Outline of Deriving Temperature of Electronic Clinical Thermometer at High Speed In this embodiment, the heat capacity of a temperature sensor of an electronic clinical thermometer is reduced to increase the heat response, thereby shortening the measurement time for obtaining actual measurement values used for prediction. In this case, selection is made based on the calculation results using a plurality of prediction equations. This makes it possible to reduce the frequency of prediction errors caused by variations in actual measurement values along with an increase in heat response.

<Internal Arrangement of Electronic Clinical Thermometer>

Figure 1A:
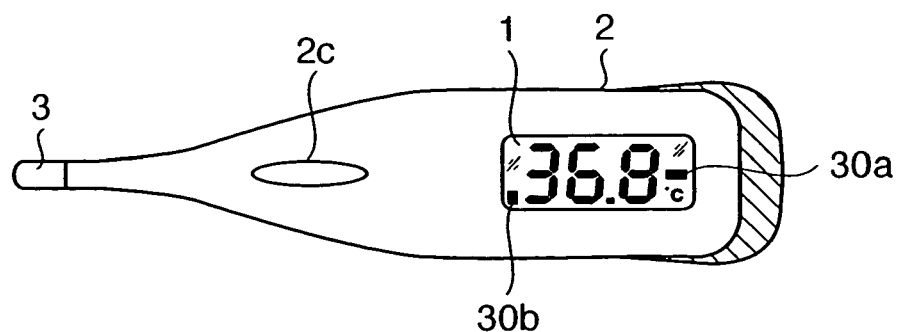
FIG. 1A is an outer view (front view) of an electronic clinical thermometer according to the first embodiment.
Figure 1B:
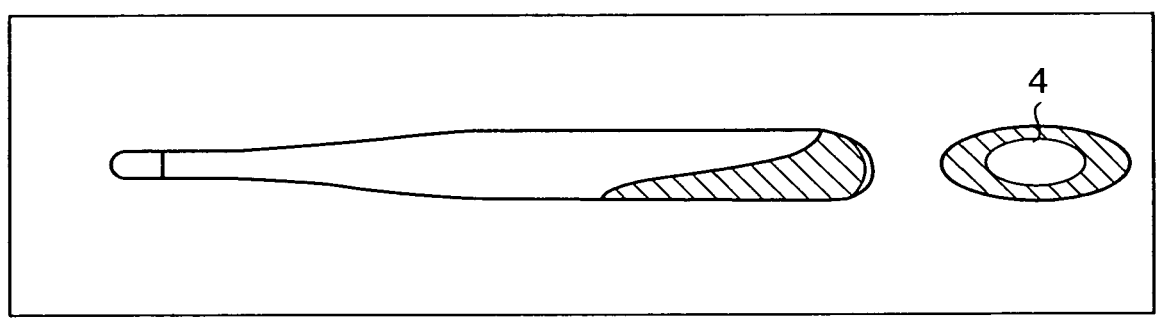
FIG. 1B is an outer view (side view) of the electronic clinical thermometer according to the first embodiment.
Figure 1C:
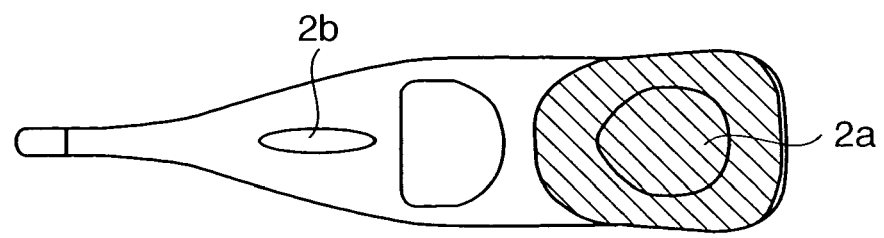
FIG. 1C is an outer view (rear view) of the electronic clinical thermometer according to the first embodiment.

FIGS. 1A to 1C are views showing the outer appearance of an electronic clinical thermometer according to an embodiment, in which FIG. 1A is a front view, FIG. 1B is a side view, and FIG. 10 is a rear view. A main body case 2 houses an electronic circuit such as an arithmetic control unit 20, a buzzer 31, a battery (power supply unit) 40, and the like. A metal cap 3 made of stainless steel houses a temperature measurement unit including a thermistor 13 (see FIG. 2) necessary for body temperature measurement. The temperature measurement unit is fixed in the metal cap 3 with an adhesive. An adhesive liquid-tightly bonds and fixes the main body cap 2 and the metal cap 3. The metal cap 3 transfers the body temperature (temperature) and protects the thermistor 13 against an external impact or the like. The main body case 2 has an outer diameter of about 3 mm, a thickness of about 0.2 mm, an overall length of about 8 mm, and a weight of 240 to 250 mg. The length of a joint portion at the distal end of the main body case 2 is about 3.5 mm to 5 mm. The heat capacity of the heat sensitive portion including the metal cap 3 incorporating the thermistor 13 is as low as about 0.1 J/° C. The main body case 2 is made of a styrene-based resin (high impact styrole or ABS resin) or polyolefin-based resin (polypropylene or polyethylene) containing about 1 to 2.5 wt % of a silver zirconium phosphate compound. A transparent window portion 1 which covers a display unit 30 and the remaining portion of the main body case 3 are molded in two colors. The window portion 1 is made of a transparent resin such as a styrene-based resin (e.g., polystyrene or a butadiene-styrene copolymer), a polyolefin-based resin (e.g., poly-2-methyl pentene or polypropylene), an acrylic resin (e.g., polymethylmethacrylate), a cellulose ester (e.g., cellulose acetate), or a polyester (e.g., polyethylene terephthalate). The end of the main body case 2 which opposes the metal cap 3 has a power ON/OFF switch 4. The lower surface of the main body case 2 has a recessed portion 2a. Upon temperature measurement, the user can easily hold the electronic clinical thermometer with the recessed portion 2a and can easily remove it from the underarm. Stoppers 2b and 2c prevent the electronic clinical thermometer from slipping during temperature measurement. A slanted line indicates a battery lid used to replace a battery and a storage position of the battery (power supply unit) 40. When the battery 40 is stored, the center of gravity is located on the front side in the longitudinal direction of the thermometer. A prediction mode display portion 30a displays a prediction mode. A mute (silent) mode display portion 30b displays a so-called mute (silent) mode in which a buzzer sound is not generated. The electronic clinical thermometer has a width of about 28 mm, a thickness of about 10 mm, and a weight of about 20 g. The position of the center of gravity, width, weight, and means for preventing from sliding stabilize the electronic clinical thermometer when it is attached to part of the human body.

Figure 2:
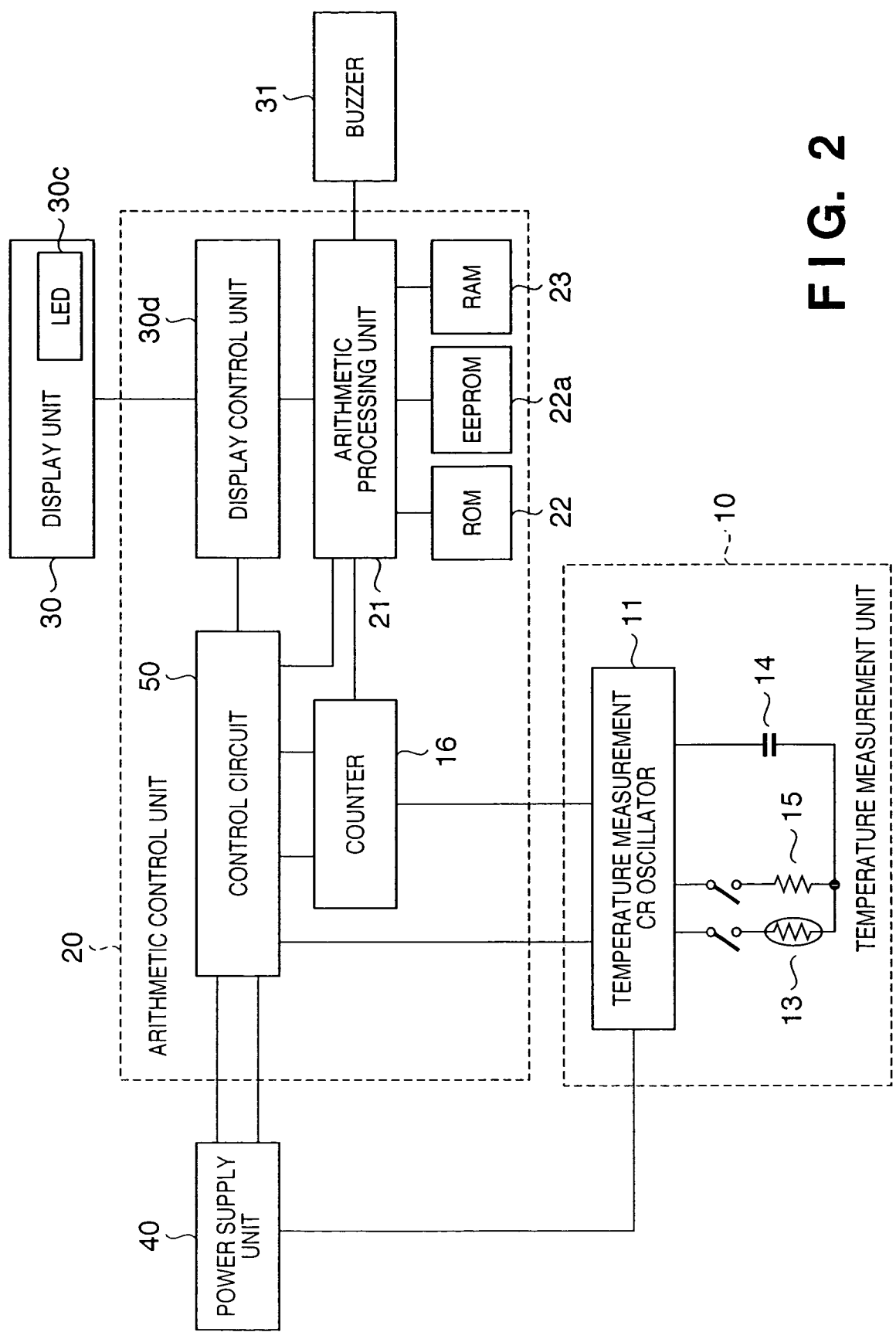
FIG. 2 is an internal block diagram of the electronic clinical thermometer according to the first embodiment.

FIG. 2 is an internal block diagram showing the arrangement of an electronic clinical thermometer according to this embodiment.

This electronic clinical thermometer comprises a temperature measurement unit 10 for measuring a temperature and outputting it as a digital value, an arithmetic control unit 20 for calculating a prediction temperature from a measured temperature and controlling this electronic clinical thermometer, and a display unit 30 which displays a measurement result and comprises a backlight LED 30c.

The temperature measurement unit 10 comprises the thermistor 13, a capacitor 14, and a temperature measurement CR oscillator 11. The thermistor 13 and capacitor 14 are connected in parallel with each other and arranged in the temperature sensitive portion. The temperature measurement unit 10 outputs the temperature as a digital amount in accordance with the count value of a counter 16 which corresponds to the temperature of the thermistor 13. Note that the arrangement of the electronic clinical thermometer 10 is merely an example and is not limited to this.

The arithmetic control unit 20 comprises an EEPROM 22a which stores parameters necessary for body temperature measurement, a RAM 23 for storing time-series measured temperatures, a ROM 22 which stores programs such as prediction equations, a display control unit 30d for controlling the display unit 30, the counter 16 for counting oscillation signals from the temperature measurement CR oscillator 11, an arithmetic processing unit 21 for performing processing under conditions written in the EEPROM 22a in accordance with the programs in the ROM 22, and a control circuit 50 for controlling the counter 16, arithmetic processing unit 21, and display control unit 30d.

As the characteristic feature of this embodiment, the heat capacity of the thermistor 13 and its vicinity is much smaller than that of the conventional prediction type electronic clinical thermometer and is thus excellent in heat response. The heat capacity of the peripheral portion includes those of the metal cap 3 contacting a measurement target of the body and covering the thermistor 13, and the adhesive between the metal cap 3 and the thermistor 13. In this manner, the improvement of heat response characteristic of the thermistor 13 readily causes variations in actual measurement values of the thermistor 13. To cope with this, the degradation of the prediction precision must be suppressed, and the suppression method will be described below.

<Grouping and Prediction Equation>

Figure 3:
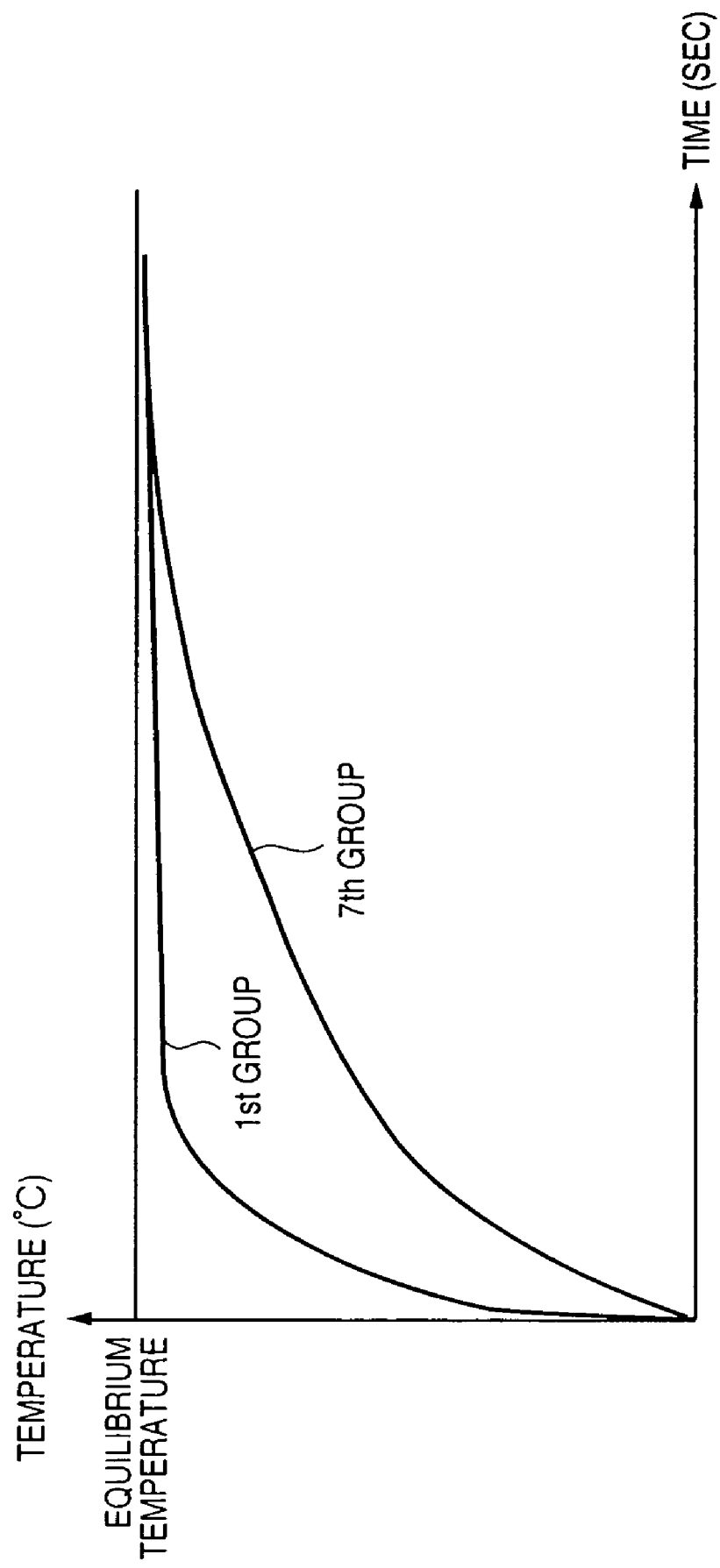
FIG. 3 shows an example of a change in the actual measurement value of a temperature detection element.

FIG. 3 is a graph exemplifying changes in actual measurement values of the electronic clinical thermometer.

As can be apparent from FIG. 3, the actual measurement value approaches the equilibrium temperature along with elapse of time. The temperature rise rate changes depending on the measurement conditions such as physical constitutions of patients, and contact states between the temperature and the body surface. The CPU groups the actual measurement values in accordance with their temporal change characteristics.

Grouping will be described from the characteristics of actual measurement values detected by the thermistor 13. In this embodiment, as described previously, the heat response characteristic of the temperature detection element is good, and the temporal change characteristics of the actual measurement values tend to vary. To cope with this heat response characteristic, the actual measurement values are grouped into the number of groups (in this case, 13 groups) larger than that of the number of conventional groups (e.g., 7 groups).

Figure 4:
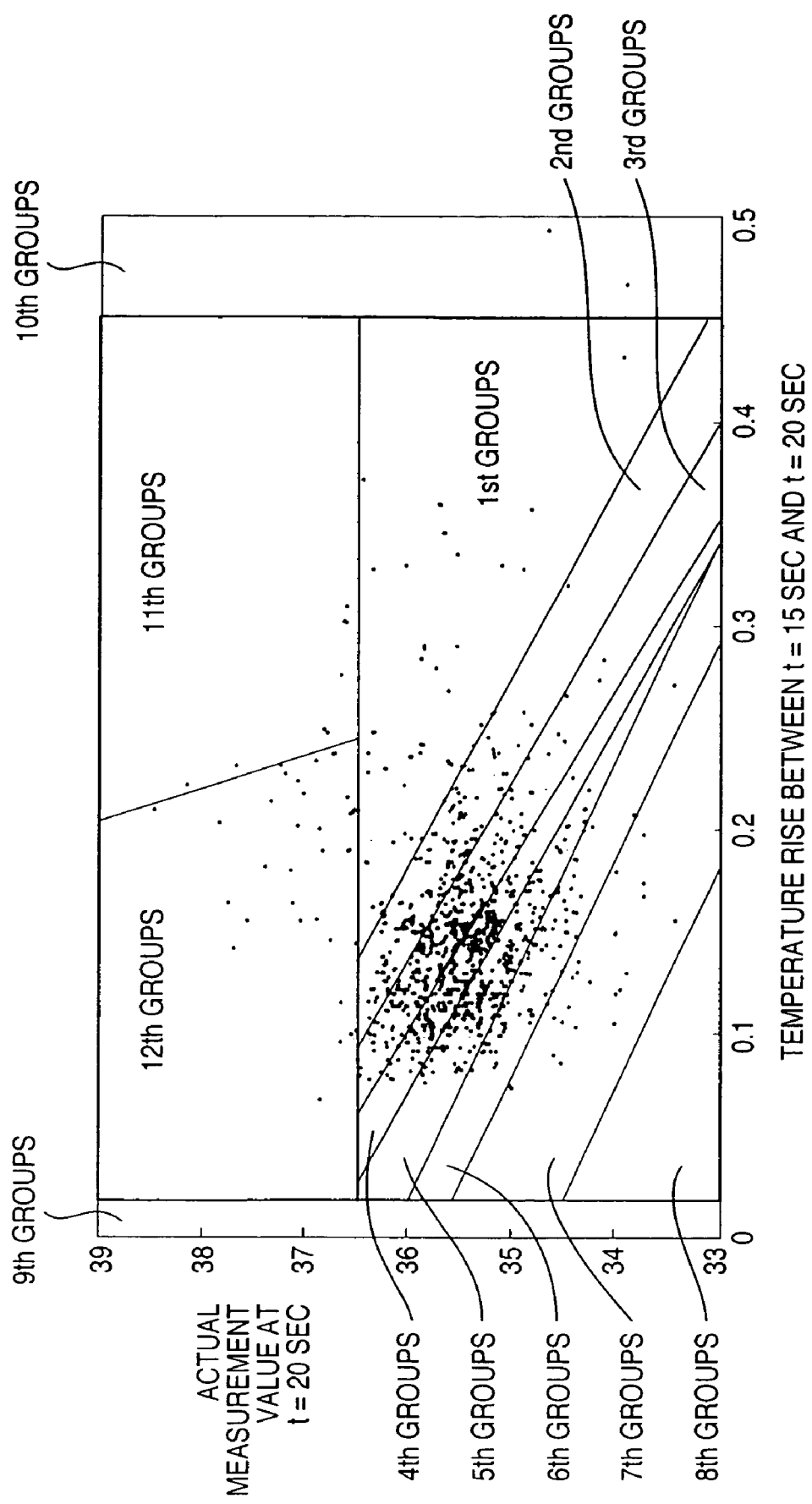
FIG. 4 is a graph for explaining grouping based on measurement values of the electronic clinical thermometer according to the first embodiment.

FIG. 4 is a graph showing a grouping example in accordance with the temporal change characteristics of actual measurement values.

FIG. 4 shows an example in which the actual measurement values are grouped into 13 groups using the temperature rise values (ordinate in FIG. 4) between t=15 sec and t=20 sec and the temperatures (abscissa in FIG. 4) at t=20 sec. The points in the graph indicate the distribution of measurement samples. Note that the first group includes actual measurement values having a highest heat response and high initial temperatures, but the temperature rise immediately declines. To the contrary, the eighth group includes actual measurement values having a lowest heat response and low initial temperatures, but the temperature rise lasts longer. Since the actual measurement values belonging to the ninth and tenth groups greatly fall outside the normal actual measurement value changes, these values may be regarded as prediction disable values, and the measurement may end with an error. Alternatively, the actual measurement value may be displayed without any prediction. The actual measurement values belonging to the 11th and 12th groups indicate body temperatures of 36.5° C. or more.

Upon the above grouping, for example, the timing at which the actual measurement value is 30° C. or more and the temperature rise rate is 0.03° C./0.5 sec is defined as a start point (t=0), and a prediction value Y can be approximated using the actual measurement value T and the elapsed time t by:

$$U=(a \times t+b) \times dT+(c \times t+d)$$

for Y=T+U, where "a" to "d" are constants, and dT is the temperature rise in the past 5 seconds.

The prediction operation is performed from t=20 sec using the coefficients "a" to "d" corresponding to the groups described in the above grouping. The coefficients "a" to "d" of the respective groups in the interval between t=20 sec and t=25 sec are exemplified below. Note that the coefficients "a" to "d" are obtained from a large number of measurement samples and are some of the parameters 22b stored in the ROM 22.

First group: a=0.554, b=−6.5185, c=−0.1545, d=2.8915
Second group: a=1.1098, b=−15.446, c=−0.244, d=4.5294
Third group: a=0.7189, b=−6.9876, c=−0.0571, d=1.0682
Fourth group: a=0.8092, b=−7.8356, c=−0.0448, d=0.8609
Fifth group: a=0.8555, b=−9.2469, c=−0.0697, d=1.5205
Sixth group: a=0.4548, b=−2.1512, c=0.0083, d=0.2872
Seventh group: a=0.378, b=−1.3742, c=0.0027, d=0.8912

<Body Temperature Measurement Operation of Electronic Clinical Thermometer>

FIG. 5 is a flowchart of a body temperature measurement processing sequence in the electronic clinical thermometer of the first embodiment. The following operation starts upon power-on or the like as a trigger by pressing the power ON/OFF switch 4. The arithmetic processing unit 21 performs the program stored in the ROM 22 to implement the respective steps to be described below.

The CPU initializes the electronic clinical thermometer in step S501 and starts detecting the temperature value of the thermistor 13. For example, the CPU detects temperature values every 0.5 sec using the sensor.

In step S502, the CPU determines, as a prediction equation reference point (t=0), a timing at which a temperature value corresponding to a temperature rise of a predetermined value (e.g., 1° C.) or more from the immediately preceding actual measurement value (i.e., the actual measurement value 0.5 sec before) is measured. The CPU starts storing the above timing and temperature value as the specific timing and actual measurement value data (time-series data) in the RAM 23. That is, upon detecting an abrupt rise in temperature, the CPU determines that the measurement operator inserted the thermometer in a predetermined measurement target.

The CPU determines in step S503 whether a decrease in measurement temperature is observed during measurement. If YES in step S503, the process advances to step S511; otherwise, the process advances to step S504.

In step S504, the CPU sequentially derives prediction values (every 0.5 sec) by the above-described prediction equation using the data stored in step S502. Unlike in the conventional case, prediction calculations are simultaneously performed using the prediction equations respectively corresponding to the plurality of groups shown in FIG. 4. In this case, the calculations (10 different calculations of 1 to 8, 11, and 12) may be performed for all the groups, or the calculations may be performed for some peripheral groups of a given group set based on several actual measurement values as elements.

In step S505, the CPU determines grouping based on the changes of the prediction values respectively corresponding to the plurality of groups derived in step S504 after a predetermined period of time (e.g., 25 sec) is elapsed from the reference point (t=0).

In step S506, the CPU stops calculating values except the groups determined in step S505 and continuously performs prediction calculations for the determined groups for a predetermined period of time.

The CPU determines in step S507 whether the prediction values derived in step S506 for the predetermined interval (e.g., t=25 sec to t=30 sec) derived in step S506 satisfy the preset prediction settling condition upon the elapse of a predetermined period of time (e.g., 30 sec) from the reference point (t=0). For example, the CPU determines whether the temperature rise rate falls within the predetermined range (e.g., 0.1° C.). If YES in step S507, the process advances to step S508; otherwise, the process advances to step S513.

In step S508, the buzzer 31 is operated to generate a buzzer sound indicating the prediction settlement, and the process advances to step S509.

In step S509, the display unit 30 displays the derived prediction value.

The CPU determines in step S510 whether an instruction to indicate the end of display of the temperature measurement result is accepted. For example, the CPU may determine whether the power ON/OFF switch 4 is pressed, or the display may automatically end a predetermined period of time after the prediction temperature display.

In step S511, the CPU corrects the measured data. This correction processing will be described in detail later. If the CPU normally corrects the data, the process returns to step S502; otherwise, the process advances to step S512.

In step S512, the buzzer 31 is operated to generate a buzzer sound indicating an error, thereby ending the temperature measurement. In this case, the buzzer sound is desirably different from that in step S508.

In step S513, when a predetermined period of time (e.g., 45 sec) has elapsed from the start of measurement by using, for example, a timer, the CPU forcibly finishes the prediction, and the process advances to step S507. That is, the CPU determines the prediction value obtained at that time as the final prediction value.

The temperature measurement operation is completed through the above steps.

<Processing of Measurement Data>

Processing (corresponding to step S511) upon occurrence of a decrease in actual measurement value (temperature) during temperature measurement using the thermistor 13 will now be described below.

FIG. 6 is a graph showing a state in which actual measurement values vary due to body movement during the measurement. Decreases in actual measurement values in the graph indicate variations (to be referred to as an initial ripple hereinafter) upon separation or the like of the sensor from a measurement portion (body surface portion).

In particular, when the heat capacity of the thermistor 13 and its peripheral portion is low as in this embodiment, the initial ripple shown in FIG. 6 is readily generated. When data representing actual measurement values with an initial ripple are directly used for prediction calculation, the prediction precision greatly degrades. When the measurement time is short (the number of measurement points is small), the dependency of prediction precision on the actual measurement point at t=0 becomes relatively large. It is therefore important to perform any data processing for suppressing the decrease in prediction precision.

A method of suppressing the decrease in prediction precision by adjusting the measurement start point (t=0) used for prediction calculation by detecting an abnormality such as a decrease in actual measurement value will be described below. That is, preprocessing of not using data obtained before the adjusted start point (t=0) must be performed.

For example, variations in actual measurement values due to body movement often occur at the start of measurement, and the changes in temperatures are limited to temporary changes, as is empirically known.

For this reason, the CPU detects a decrease in actual measurement value (step S503). At a timing when actual measurement values increase again, the CPU determines that the variations in actual measurement values are caused by the body movement, provided that all the following four conditions are satisfied, thereby changing the t=0 timing. Note that the 0-sec point adjustment conditions are not limited to the ones illustrated here. Any conditions suffice if the CPU can detect temporarily different changes from the normal temperature changes shown in FIG. 3.

A time interval ($\Delta t1$) from the measurement start point to the timing at which a decrease in temperature value is detected falls within a setting value (e.g., 7 sec).

A temperature value (T) detected by the sensor is less than a setting value (e.g., 34.5° C.).

A time interval ($\Delta t2$) from the timing at which the decrease in temperature value is detected to a timing at which the temperature value increases falls within a setting value (e.g., 8 sec).

A decrease in temperature ($\Delta T$) falls within a setting range (e.g., 1° C.).

A prediction value upon adjusting the t=0 timing is derived using time-series data using the adjusted t=0 as the measurement start point. That is, data obtained prior to the adjusted t=0 timing are not used to derive prediction values.

Assume that actual measurement values do not satisfy the above conditions and have changes greatly different from the normal temperature changes shown in FIG. 3. For example, assume that actual measurement values continuously decrease. In this case, even if the measurement continues, the CPU determines that a sufficient precision cannot be obtained. As described above, the process advances to step S512 and ends with an error. The CPU desirably prompts the measurement operator to perform temperature measurement again.

As has been described above, the electronic clinical thermometer of this embodiment can implement an electronic clinical thermometer with a low frequency of errors, thereby reducing the load on the measurement operator.

Other Embodiments

The object of the present invention is realized even by supplying a program for implementing the functions of the embodiment described above to a system or an apparatus, and causing the computer of the system or the apparatus to read out and execute the supplied program codes. Therefore, in order to cause the computer to implement the functions of the present invention, the program codes themselves installed in the computer constitutes the technical scope of the present invention.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing based on the instructions of the program codes. This processing also implement the functions of the above-described embodiment.

The invention claimed is:

1. An electronic clinical thermometer for determining an equilibrium temperature by using a plurality of prediction equations based on a temporal change in actual measurement value of a temperature at a measurement target detected by a temperature detection element, comprising;

derivation means for deriving prediction values based on actual measurement values starting from a reference point;

abnormal change detection means for detecting an abnormal change of an actual measurement value from the temperature detection element;

adjustment means for adjusting said reference point when said abnormal change detection means detects the abnormal change;

selection means for selecting one prediction equation from said plurality of prediction equations, said one prediction equation being used for deriving said equilibrium temperature based on the changes of the prediction values derived by said derivation means for each prediction equation after a first predetermined period of time is elapsed from said reference point; and determination means for determining whether the prediction values derived by the prediction equation selected by said selection means satisfy a preset prediction settling condition after a second predetermined period of time, which is longer than said first predetermined period of time, is elapsed from said reference point.

2. The electronic clinical thermometer according to claim 1, wherein the abnormal change includes at least a decrease in actual measurement value.

3. The electronic clinical thermometer according to claim 1, wherein the adjustment means adjusts said reference point to a timing at which the abnormal change of the actual measurement value is complete.

4. The electronic clinical thermometer according to claim 1, wherein the temperature detection element and a peripheral portion thereof have a heat capacity as low as 0.1 J/° C. and a high heat response, and wherein said first predetermined period of time is about 25 seconds and said second predetermined period of time is about 30 seconds.

* * * * *